UNITED STATES PATENT OFFICE.

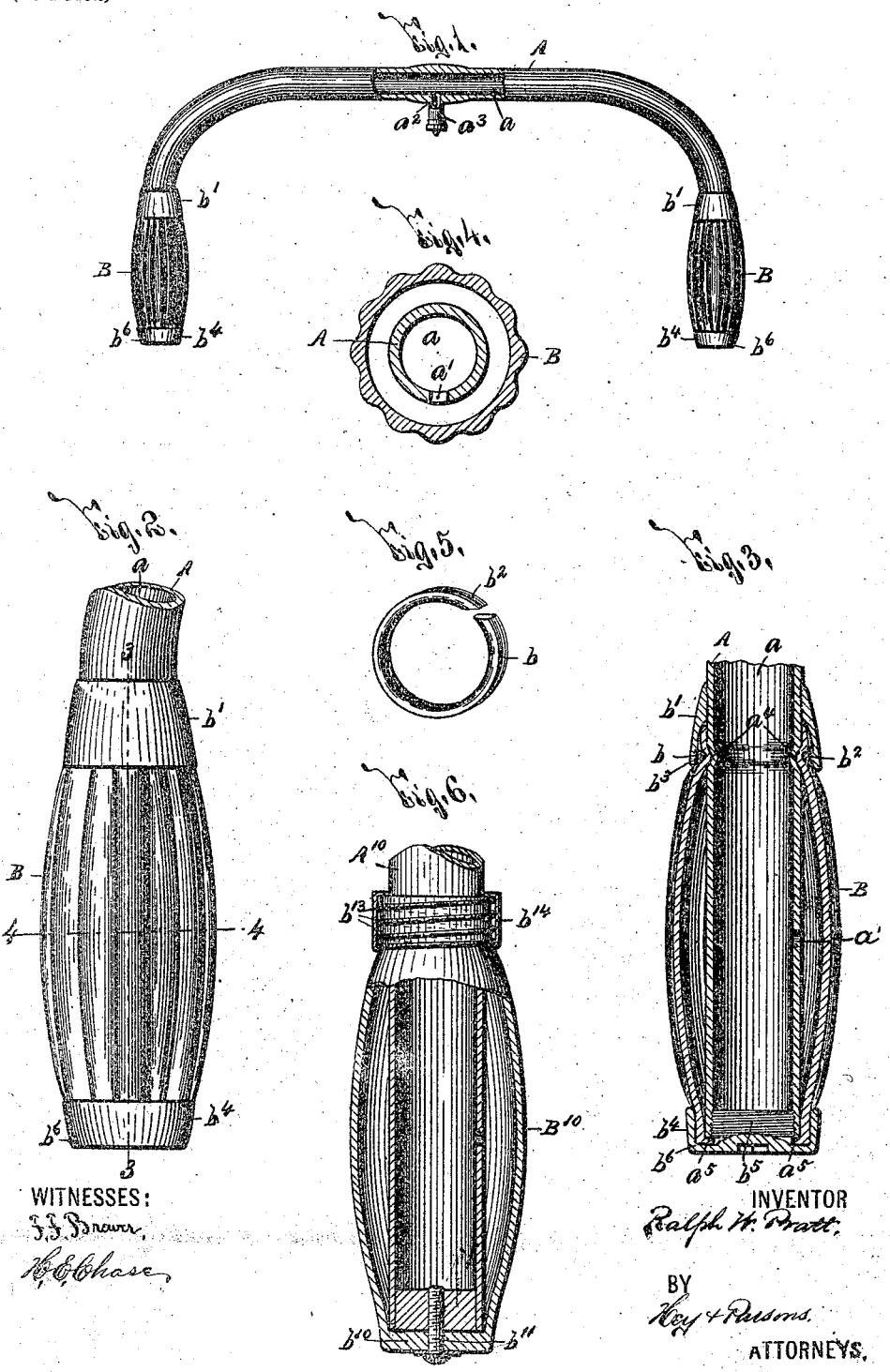

RALPH W. PRATT, OF ORWELL, NEW YORK.

VELOCIPEDE-HANDLE.

SPECIFICATION forming part of Letters Patent No. 652,981, dated July 3, 1900.

Application filed May 24, 1897. Serial No. 637,832. (No model.)

*To all whom it may concern:*

Be it known that I, RALPH W. PRATT, of Orwell, in the county of Oswego, in the State of New York, have invented new and useful Improvements in Velocipede-Handles, of which the following, taken in connection with the accompanying drawings, is a full, clear, and exact description.

My invention relates to improvements in handles for bicycles or other velocipedes, and has for its object the production of a simple and practical device for reducing to a minimum the vibration of the rider's arms; and to this end the invention consists in the combination, construction, and arrangement of the component parts of a handle, as hereinafter fully described, and pointed out in the claims.

In describing this invention reference is had to the accompanying drawings, forming part of this specification, in which like letters indicate corresponding parts in all the views.

Figure 1 is a top plan, partly broken away, of my improved handle. Fig. 2 is an enlarged top plan of one end of said handle. Figs. 3 and 4 are detail sectional views taken, respectively, on lines 3 3 and 4 4, Fig. 2. Fig. 5 is an isometric view of one of the detached split rings for securing the handpieces in position.

My improved handle may be of any desired form or size, is secured to the fork-stem of a bicycle or other velocipede, (not illustrated,) and comprises a handle-bar A and oppositely-arranged inflatable handpieces B B. The handle-bar A preferably consists of a metallic tube bent in any desirable form and having its lengthwise passage or conduit $a$ provided with suitable outlet and inlet openings $a'$ $a'$ $a^2$. The outlet-openings $a'$ $a'$ are generally arranged in proximity to the ends of the handle-bar A, and the inlet-opening $a^2$ is usually formed in the intermediate portion of said handle-bar and is provided with an automatically-closing valve $a^3$. The opposite ends of the handle-bar A are preferably provided with annular grooves $a^4$ $a^4$, interposed between the outlet and inlet openings $a'$ $a'$ $a^2$.

The handpieces B B may be formed of any suitable inflatable material and preferably consist of rubber tubes which encircle the ends of the handle-bar A and are secured thereto at opposite sides of the outlet-openings $a'$ $a'$ by suitable inner and outer clamping-pieces. The inner ends of the tubes forming the handpieces B B extend slightly beyond the annular grooves $a^4$ $a^4$, and the outer ends of said tubes are provided with inwardly-projecting flanges or shoulders $a^5$ $a^5$, which are normally engaged with the end faces of the handle-bar A. The external surfaces of the intermediate portions of said tubes forming the handpieces B B are preferably provided with lengthwise corrugations for obviating undue perspiration of the hands and affording a positive grip on said handpieces.

The inner clamping-pieces for the handpieces B B preferably consist of split rings $b$ $b$ and adjustable sleeves $b'$ $b'$. The split rings $b$ $b$ encircle the inner or adjacent ends of the handpieces, are alined with the annular grooves $a^4$ $a^4$ in the handle-bar A, and are provided with peripheral threads $b^2$. The sleeves $b'$ $b'$ are adjustable lengthwise of the handle-bar A, are each provided with internal tapering threads $b^3$ for engaging the peripheral threads of the split rings $b$ $b$, and operate to firmly clamp or embed the inner ends of the handpieces B B into the annular grooves $a^4$ $a^4$. The outer clamping-pieces for the handpieces B B preferably consist of suitable caps $b^4$ $b^4$, which encircle the ends of said handpieces and are provided with substantially-central threaded projections $b^5$ $b^5$, screwing within the ends of the handle-bar A. Said caps $b^4$ $b^4$ are preferably provided with annular faces $b^6$ $b^6$ for engaging the flanges or shoulders $a^5$ $a^5$ of the handpieces B B and forcing said flanges or shoulders against the end faces of the handle-bar A.

In the operation of my invention the valve $a^3$ is opened for permitting the entrance of the inflating fluid which passes through the outlet-openings $a'$ $a'$ into the handpieces B B and similarly inflates said handpieces. My improved handle-bar thus requires but a single inlet-opening in order to permit the inflation of both of the handpieces and maintains a like pressure in each handpiece.

The construction and operation of my improved handle-bar will now be readily understood upon reference to the foregoing description and the accompanying drawings.

Having thus fully described my invention, what I claim as new, and desire to secure by Letters Patent, is—

1. The combination of a tubular handle-bar provided with inlet and outlet openings, an inflatable handpiece consisting of a tube encircling the handle-bar and inclosing an internal chamber communicating with the outlet-opening of the handle-bar, said handpiece being extended beyond opposite sides of the outlet-opening of the handle-bar, means for closing one end of the tube forming the handpiece, a split ring encircling the other end of said tube, and a sleeve adjustable lengthwise of the handle-bar and engaged with the split ring for clamping the same in its operative position, substantially as and for the purpose specified.

2. The combination of a tubular handle-bar provided with inlet and outlet openings and an annular groove, an inflatable handpiece consisting of a tube encircling the handle-bar and inclosing an internal chamber communicating with the outlet-opening of the handle-bar, said handpiece being extended beyond opposite sides of the outlet-opening and the annular groove of the handle-bar, and having its outer end formed with an inwardly-projecting flange or shoulder engaged with the adjacent end face of the handle-bar, a split ring encircling the other end of said tube and alined with the annular groove of the handle-bar, a sleeve adjustable lengthwise of the handle-bar and engaged with the split ring for clamping the same in its operative position, and thereby closing the corresponding end of the internal chamber of said handpiece and a cap for closing the other end of the tube, and thereby closing the other end of said internal chamber, said cap being engaged with the inwardly-projecting flange or shoulder of the tube and being formed with a substantially-central projection screwing within the adjacent end of the handle-bar, substantially as and for the purpose described.

In testimony whereof I have hereunto signed my name, in the presence of two attesting witnesses, at Orwell, in the county of Oswego, in the State of New York, this 18th day of May, 1897.

RALPH W. PRATT.

Witnesses:
M. L. SPRINGSTEEN,
C. M. GROOT.